M. A. DEES.
PNEUMATIC TIRE.
APPLICATION FILED NOV. 24, 1913. RENEWED AUG. 29, 1914.
1,144,959.  Patented June 29, 1915.
Fig. I.
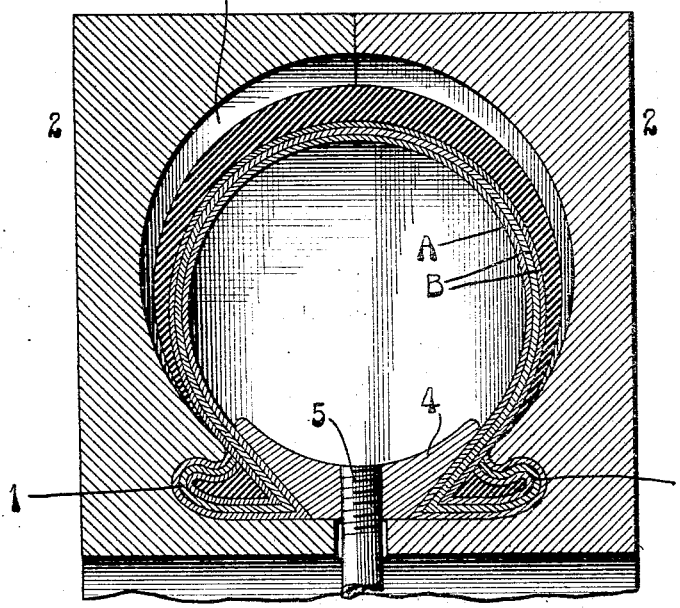
Fig. II.
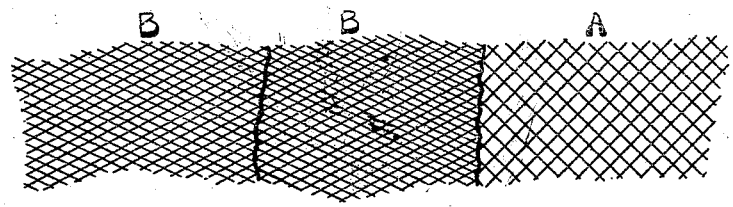
Fig. III.
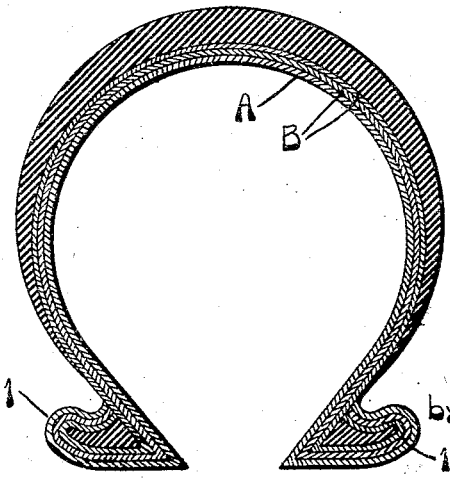
Attest
Inventor:
M. A. Dees
Att'ys.

UNITED STATES PATENT OFFICE.

MARK A. DEES, OF ST. LOUIS, MISSOURI, ASSIGNOR TO THE AMERICAN TIRE COMPANY, OF ST. LOUIS, MISSOURI, A CORPORATION.

PNEUMATIC TIRE.

1,144,959.     Specification of Letters Patent.     Patented June 29, 1915.

Application filed November 24, 1913, Serial No. 802,877. Renewed August 29, 1914. Serial No. 859,263.

*To all whom it may concern:*

Be it known that I, MARK A. DEES, a citizen of the United States of America, and a resident of the city of St. Louis and State of Missouri, have invented a certain new and useful Improvement in Pneumatic Tires, of which the following is a full, clear, and exact description, reference being had to the accompanying drawings, forming a part of this specification.

My invention relates to pneumatic tires, or, more specifically stated, to the casings of pneumatic tires in which inflatable tubes are used, and has for its object the production of a tire of this kind comprising plies of rubberized fabric so incorporated in the tire structure as to render the structure more durable and less liable to punctures or ruptures than similar structures heretofore made.

The present invention is in the nature of an improvement upon the pneumatic tire casing shown and described in Letters Patent of the United States No. 1,055,774, issued March 11, 1913, to the American Tire Company.

The tire shown and described in the patent mentioned includes a plurality of plies of rubberized fabric, with the fabric threads in all of the plies uniformly tensioned to, approximately, the limit of their elasticity and substantially held at such degree of tension by the vulcanized rubber in the tire casing structure.

Experience has shown that a tire casing made in accordance with the patent is of great durability and longevity, due to the threads in the rubberized fabric plies being stretched, as described, to destroy their elasticity, as contemplated by the patent. Experience has also, however, shown that with the fabric threads in all of the plies under severe tension, or drawn very taut, as contemplated by the patent, they are rendered more susceptible to being cut or rended.

By my improvement, I produce a pneumatic tire structure which is much less vulnerable, when the tire is subjected to the action of sharp objects which tend to cut or rend the fabric in the tire. This object I attain in my tire by employing with a ply or plies of fabric, stretched in accordance with the practice heretofore in vogue, a ply of fabric joined by vulcanized rubber to the stretched ply or plies, so that it will give or yield freely in comparison to the other ply or plies in which the threads, being normally tensioned, are easily cut or broken. The extensible ply referred to is located innermost or nearest the cavity in the tire, so that it is nearest the inflatable inner tube and it is, therefore, so positioned as to be farthest from the tread of the tire against which a sharp object encountered upon a roadway would be first directed; and by being in proximity to the inner tube it initially receives the force of said inner tube, and is capable of yielding under such force instead of being ruptured, as a normally tensioned or stretched fabric would be in the same location.

Figure I is a transverse section of a raw tire embodying the features of my invention, showing the tire arranged in a vulcanizing mold. Fig. II is a diagrammatic view of the layers of fabric. Fig. III is a transverse section of the finished tire.

In producing my pneumatic tire, I first form the tire structure upon a suitable annular mandrel, (not shown), by winding rubberized fabric bands around the periphery of the mandrel while the rubber with which the fabric is impregnated is in a raw state. The inner ply A of rubberized fabric is first wound around the mandrel as loosely as it can be positioned thereon, so as to avoid stretching or tensioning of the threads to a material or substantial degree. This inner fabric ply forms an important element of my invention, and in accordance with the theory of the invention, it would be desirable to avoid all stretching or tensioning of the inner fabric ply A while it is being wound onto the mandrel. In practice, however, the transverse middle portion of the fabric band may be elongated or stretched to a slight degree, so that the fabric will readily fit onto the sides of the annular mandrel; and, before applying the second ply of fabric, the inner ply is pressed onto the mandrel to produce a smooth surface conforming to the shape of the mandrel. If desired, the band of rubberized fabric forming the inner ply A may be laid onto the annular mandrel without being tensioned at all, and in this event, the fabric threads are preferably compacted or brought closer together at the sides of the mandrel by the use of milling tools, or other suitable smoothing devices. The succeeding plies of fabric are formed by stretching fabric bands around the periphery of the mandrel, the transverse middle portions of the bands being severely tensioned and pulled tightly onto the middle portion of the preceding ply. The margins of such bands become wrinkled while their middle portions are being stretched and distorted to conform to the shape of the periphery of the mandrel, and the wrinkled portions of the fabric bands are afterward smoothed by the application of milling tools, or in any other suitable manner. After the fabric plies are formed on the mandrel, beads 1 may be formed at the edges of the fabric, and a layer of raw rubber is applied to the outermost fabric ply. The raw tire may then be vulcanized in any suitable manner, but it is preferably placed in a vulcanizing mold, consisting of mold sections 2 fitted together to provide a tire receiving cavity 3.

4 designates an abutment ring forming a fluid tight joint at the separable edges of the tire, and 5 is a pipe for conducting fluid under pressure to the interior of the tire. The raw tire is preferably separated from the walls of the cavity 3 in the mold, so that the tire may be expanded by internal fluid pressure to stretch the fabric structure, placing the threads of the outer fabric plies B under uniform tension, and preferably stretching the threads of said plies to, approximately, the limit of their elasticity. It is to be understood that the entire fabric structure is expanded by the internal fluid pressure, but the threads of the slack inner fabric ply A are not tensioned like the threads of the outer fabric plies.

As before stated, the inner fabric ply is carefully laid onto the mandrel in a manner to avoid unnecessary stretching of its threads, while the outer fabric plies are severely tensioned during the process of building up the fabric structure. Therefore, the final stretching operation, which takes place in the vulcanizing mold, places the outer fabric plies B under a high degree of tension, but does not subject the inner fabric ply A to severe tensile strains. The tensile strength of the inner ply is not materially affected by the final stretching operation.

My improved tire possesses all of the advantages found in the tire shown in the prior patent to which I have referred. The outer fabric plies will resist the service pressure of an inner tube without yielding in the rubber, and the tire is therefore free from internal strains to which tires are usually subjected by the stretching of the fabric in the rubber. The tensioned fabric plies resist the inner tube pressure so that the rubber is not materially stretched by the internal pressure of the tube, and this is quite important, for the reason that the unstretched rubber will withstand the service conditions without rupture for a much longer period of time than tensioned rubber. It is true that the threads of the stretched outer plies of fabric B are drawn very taut in the process of manufacture by the internal pressure in the raw or unvulcanized tire structure, so that such threads do not retain all of their original strength. Obviously, the tensioned threads may be rended by a cutting action that would not rend untensioned threads. One of the decided advantages of the substantially untensioned inner ply A will now be apparent. This comparatively loose or extensible inner ply possesses substantially all of its original strength, and, under ordinary conditions, it is not tensioned by the pressure of the inner tube. The tube presses against the inner ply A, but the latter is prevented from stretching by the non-yielding outer plies B. The inner ply therefore retains its strength until the outer plies are worn away, punctured, or otherwise ruptured, and the strong inner ply then comes into service to resist the pressure of the inner tube, and it always serves to resist the cutting action of an object tending to puncture the tire much more effectually than it would if the threads were under the same tension as those in the outer plies.

The invention so far described lies in the highly tensioned fabric plies B adapted to resist the internal tube pressure without stretching the rubber, combined with the comparatively free inner ply compensating for a certain weakness of the highly tensioned plies.

In manufacturing the tire, another very important advantage is found in the peculiar combination of fabric elements. The fluid under pressure introduced into the raw tire would permeate into the initially tensioned fabric plies and destroy the commercial value of the tire, if this tensioned fabric was exposed directly to the fluid, but I have found in practice that the comparatively untensioned fabric ply A forms a seal capable of resisting the fluid under pressure, so that the fabric structure is not in any way injured by the steam or other fluid utilized in expanding the raw structure.

I claim:—

1. A pneumatic tire comprising a plurality of outer plies of rubberized threads normally uniformly tensioned, and an inner ply of rubberized threads normally tensioned to a less degree than the threads in said outer plies, the rubber being vulcanized and connecting the various plies into a unitary structure.

2. A pneumatic tire comprising a plurality of outer plies of rubberized threads normally uniformly tensioned to a degree preventing the extension of the threads by tire inflation pressure, and an inner ply of rubberized threads normally tensioned to a less degree than the threads in said outer plies, the rubber being vulcanized and connecting the various plies into a unitary structure.

3. A pneumatic tire comprising a plurality of outer plies of rubberized threads normally uniformly tensioned to, approximately, the limit of elasticity of the threads, and an inner ply of rubberized threads normally tensioned to a less degree than the threads in said outer plies, the rubber being vulcanized and connecting the various plies into a unitary structure.

MARK A. DEES.

In the presence of—
E. B. LINN,
E. K. CLARK.